Patented July 10, 1934

1,965,815

UNITED STATES PATENT OFFICE 1,965,815

COMPOSITION MATERIAL

Harold B. Underwood, Racine, Wis., assignor of one-half to Gustav K. Franklin, Chicago, Ill.

No Drawing. Application February 4, 1931, Serial No. 513,357

11 Claims. (Cl. 106—8)

The invention relates to a composition which may be used as a joint packing or for other purposes, and to the method of making the same. The composition may be used for many different purposes but it is especially adapted for packing joints in low pressure pipe lines to form an efficient seal which will withstand the ordinary strains incident to expansion and contraction, bending or sagging of the pipe line.

The object of the invention is to provide a composition material which may be sold in a mass adapted, for example, to be pressed or forced into place to pack and seal a joint, the material being of a character which will take on resilient rubbery properties as the result of the working, kneading or other manipulation to which it is subjected in packing the joint.

Another object is to treat a water suspension of rubber so as to form a mass in reversible condition adapted when used to be automatically thrown into irreversible condition by the manipulation required in the use thereof, as in packing a joint, and take on resilient rubbery properties.

Another object is to provide for vulcanizing the material in use by the application of heat direct thereto or by service application of heat as in the case of a hot water line.

Another object is to control the amount of manipulation required for changing the composition material from the reversible condition to the irreversible condition by variations in the compounding materials used in preparing the composition material.

The invention has other objects and advantages, some of which will be pointed out hereafter in the following detail description.

The physical characteristics of a reversible water mixture of rubber, whether a natural suspension such as liquid latex, or an artifical suspension of rubber in water, may vary from a liquid or a thin paste to a plastic putty-like mass depending upon the amount of compounding materials and pigments that are added. The physical characteristics of an irreversible mixture resemble those of an unvulcanized rubber compound mixed in a mill in the ordinary way, except that the irreversible mixture is stiffer and more resilient than the mill mixed compound.

I have discovered that it is possible to compound a rubber suspension, such as concentrated liquid latex, with certain ordinary pigments, vulcanizing materials and accelerators, to form a mass still in the versible condition which can be used for different purposes, such, for example, as for packing a joint by working, kneading, pressing, forcing or otherwise manipulating the material to fill the joint; and that this manipulation of the material in packing the joint will automatically throw the reversible rubber suspension into the irreversible condition and take on resilient rubbery properties while it forms a packing seal for the joint.

I have also discovered that it is possible to control the amount of manipulation necessary to throw the mixture into the irreversible condition, that an increase in the amount of the compounding materials used will generally lessen the manipulation required, and that a decrease in the amount of the compounding materials used will generally require more manipulation of the material. The addition of small amounts of such materials as lime or calcined magnesia, have a marked increase on the rapidity of the change to the irreversible condition. If the compound contains vulcanizing material and an ultra-accelerator, the packing may be vulcanized in the joint by the application of heat to the packing or to the joint or by service application of heat as in a hot water line.

A typical formula for a rubber suspension according to my invention is as follows:

| | Parts by weight |
|---|---|
| Concentrated latex 70% rubber content | 143 |
| Sulphur | 6 |
| Accelerator-zinc sal of di-methyl-di-thio-carbamic acid | 2 |
| Zinc oxide | 25 |
| Whiting | 50 |
| Lime | 2 |

It will be found convenient to first add the sulphur and the accelerator to the latex, and then intimately mix the zinc oxide, whiting and lime and add this mixture to the latex, sulphur and accelerator mixture a little at a time to prevent local coagulation while stirring. The final mixture constitutes the composition material which is ready for immediate use, but I prefer that it should stand at least twenty-four hours before being used. The material may be placed in containers and sealed for sale and shipment.

The control of the rate of change from the reversible to the irreversible condition may be regulated, as follows:

Very small amounts of hydrated lime, calcium hydroxide $Ca(OH)_2$, have a decided effect on the rate of change. Amounts greater than 2% on 100% rubber cause a change too rapid to be practicable. For certain purposes it may be desirable to have a slower rate of change and this may be effected by reducing the lime. Amounts of lime less than 1% make the rate of change too slow to be practicable for packing. Magnesia oxide (heavy calcined magnesia) has the same action as lime, but is more powerful and is not practicable as it causes too rapid a change. At least 5% of zinc oxide on 100% rubber is necessary for activation of the accelerator. Additional amounts of zinc oxide may be added without material effect on the rate of change from reversible to irreversible until an amount is added approximately 25% on 100% of rubber. Additional amounts greater than this are apt to cause local coagulation. The addition of whiting has no appreciable effect until an amount is added equal to 50% on 100% rubber. Additional amounts of whiting above this amount rapidly increase the rate of change so that in some cases the material may set up or change to the irreversible form before being completely packed into the joint. Carbon black causes a very rapid setting up if added in amounts greater than 10% on 100% rubber. The choice of compounding ingredients and the amount of same is that which will give the desired rate of change for the purpose intended. The invention is not limited to the above formula as a whole or to the ingredients or proportions thereof, but it includes any combination of compounding materials added to any water suspension of rubber, natural or artificial, which will produce a plastic reversible paste or mass which can be used for such purposes as packing a joint and which, by the manipulation required in using it, will be changed to an irreversible condition in its final form as a permanent seal for a joint or other use; and it may or may not be vulcanized as required. The water suspensions of rubber which produce a reversible plastic paste or mass, as above described, are those containing added protective colloids in addition to the natural protective colloids. Natural latices are concentrated by adding a protective agent which prevents coagulation as the percentage of rubber particles to the water is increased. For concentrations up to about 60% of rubber, ammonia or ammonium hydroxide is commonly used. In concentrates above 60% of rubber, a protective agent or colloid is added which may be sodium hydroxide, potassium hydroxide, or either or both of these alkalies with a soluble soap. When a soluble soap is used as a protective colloid, the small amount of hydrated lime added has the effect of forming calcium soap which tends to invert the emulsion. The presence of a small amount of lime or calcium compounds, such as calcium sulphate with similar properties as to solubility, also has a tendency to reduce the negative charge on the droplets of rubber hydrocarbon which facilitates the formation of a uniform coherent rubber film upon coagulation by pressure or evaporation under proper conditions. These effects produce a coagulum which is quite dense and moderately uniform. In the presence of the added protective agents or colloids, the action of the hydrated lime as a coagulant is modified. Instead of the coagulum having a weak and open mesh structure, it has a dense homogeneous or close mesh structure. The purpose of the addition of the calcium hydroxide, calcium sulphate, or other substance which gives the same effect as the calcium compound, is to produce in the emulsion a peculiar state, herein called a condensed state, (wherefore the action bringing about this state is called a condensing action) even if such a condition of the rubber particles may not be revealed under the microscope, and in which agglomeration of the rubber particles has not taken place to such an extent as to be considered coagulation but is in a state such that the emulsion is metastable and thus goes over into a coagulated state either when the emulsion, together with suspended fillers and other ingredients specified, is worked mechanically to a sufficient extent, or when water is allowed to evaporate from the mixture, or when water is allowed to evaporate from larger masses of the material. The salts or compounds which give the proper degree of condensing action are the slightly soluble salts of the alkaline earths or other compounds of the alkaline earths such as calcium hydroxide and calcium sulphate. The paste composition material of this invention when in a reversible condition is in a state of stabilized agglomeration and when coagulated by evaporation or by mechanical means, such as pressure as in packing a joint, a homogeneous or close mesh structure of rubber results. As the coagulum resulting from the use of a small quantity of lime is quite dense, it is particularly adaptable for use as a joint packing. Moreover, a limed material may be spread as a film on cloth or the like or a substance may be impregnated with a limed material and the change from reversible to irreversible condition may be brought about by evaporation which is quite sharply distinguished from a coating resulting from coagulation of a material not containing a small amount of lime, for such unlimed material produces a film which is non-homogeneous and which tends to trap moisture and wherein migration occurs, that is to say, the rubber particles tend to move toward areas whereat evaporation is most rapid, which are the outer surfaces and consequently the film is thin or otherwise imperfect at some parts and thick at other parts. The invention may be used for many different kinds of packing material and for many different purposes; it can be supplied in a paste or putty-like mass for use as described above or it can be made up in the finished form of gaskets, washers and the like. It is especially adapted for packing joints in gas lines which are now generally packed with metallic lead or Portland cement forming rigid inflexible joints subject to strains from expansion, contraction, bending and sagging which cause leaks and breaks and involve large expense for repairs and maintenance.

A packing material according to this invention may be used with or without the ordinary hemp material to form a gas tight joint in a low pressure pipe line which is sufficiently flexible to accommodate any ordinary strains in the line without leaking or breaking.

The composition material made according to the above formula will contain approximately 20% water from the water in the latex. When the compound goes into irreversible condition the tendency is for the water to be forced from the interior to the surface of the mass and while the water remaining in the interior of the mass may in some cases cause a slight porosity in the mass, this does not render the compound unfit for use as a joint packing in low pressure service, such as gas lines, or when compressed in a gasket or other form of packing, as for a hot water faucet or for many other purposes. By the use of my invention in packing the joints of a gas line it has been made possible to double the pressure in the line without breaking a joint or producing a leak, and gaskets made with packing of my invention and used in hot and in cold water lines have held sixty pounds water pressure without showing any evidence of failure.

While I have described the invention primarily as it would be prepared and used as a joint packing, I do not thereby intend to restrict the invention to the particular ingredients or proportions or uses specified but reserve the right to make such changes and alterations as fall within the scope of the following claims.

I claim:

1. A composition material including a mixture of a water suspension of rubber containing added protective agents or colloids and sufficient hydrated lime not to exceed 2% of the rubber to insure that the mixture will pass into irreversible condition upon manipulation of the material.

2. A composition material including a mixture of a water suspension of rubber containing added protective agents or colloids, vulcanizing materials and sufficient hydrated lime not to exceed 2% of the rubber to insure that the mixture will pass into irreversible condition upon manipulation of the material.

3. A composition for joint packing and other purposes consisting substantially of 143 parts by weight of concentrated latex 70% rubber content, suitable amounts of sulphur and accelerator, not more than 2 parts by weight of lime, and sufficient quantities of zinc oxide and whiting to impart required toughness and hardness to the packing.

4. A composition for joint packing or other purposes comprising a mixture of a water suspension of rubber and compounding materials including added protective agents or colloids, not to exceed 2% of a condensing substance selected from the slightly soluble salts or compounds of the alkaline earths, and vulcanizing materials, said water suspension of rubber and said compounding materials being mixed in a reversible condition and forming a packing material adapted to be automatically thrown into irreversible condition and upon coagulation to produce rubber of homogeneous or close mesh structure.

5. A composition for joint packing or other purposes comprising a water suspension of rubber and compounding materials including added protective agents or colloids, not to exceed 2% of a substance selected from the slightly soluble salts or compounds of the alkaline earths, and pigments, said water suspension of rubber and said compounding materials being mixed in a reversible condition and forming a packing adapted to be automatically thrown into irreversible condition and upon coagulation to produce rubber of homogeneous or close mesh structure.

6. A composition comprising a water suspension of rubber and compounding materials including pigments, added protective agents or colloids, not to exceed 2% of a condensing substance selected from the slightly soluble salts or compounds of the alkaline earths, and vulcanizing materials, said water suspension of rubber and said compounding materials being compounded into a mass in reversible condition and forming a material which is automatically thrown into an irreversible condition and upon coagulation to produce rubber of homogeneous or close mesh structure.

7. The method of making a composition for joint packing and other purposes which consists in preparing a reversible mixture of a water suspension of rubber containing a protective agent or colloid and not to exceed 2% of a condensing substance selected from the slightly soluble salts or compounds of the alkaline earths, such as hydrated lime, and but a sufficient quantity of said condensing substance to insure that the mixture will pass into an irreversible condition upon manipulation of the material.

8. A composition paste material adapted to be coagulated to produce a homogeneous or close mesh structure of rubber and containing a concentrated rubber emulsion and not to exceed 2% of a substance selected from the slightly soluble salts or compounds of the alkaline earths which tends to invert the emulsion whereby the material is transformed into a state of stabilized agglomeration.

9. A composition paste material adapted to be coagulated to produce a homogeneous or close mesh structure of rubber and containing a concentrated rubber emulsion containing added protective agents or colloids and not less than substantially 60% of rubber, and not to exceed 2% of a substance selected from the slightly soluble salts or compounds of the alkaline earths which tends to invert the emulsion whereby the material is transformed into a state of stabilized agglomeration.

10. A composition paste material adapted to be coagulated to produce a homogeneous or close mesh structure of rubber and containing a concentrated rubber emulsion containing added protective agents or colloids and not less than substantially 60% of rubber, and not to exceed 2% of a substance selected from the slightly soluble salts or compounds of the alkaline earths such as calcium hydroxide and calcium sulphate which tends to reduce the negative charges on the rubber hydrocarbon in the emulsion.

11. A composition paste material adapted to be coagulated to produce a homogeneous or close mesh structure of rubber and containing a concentrated rubber emulsion containing added protective agents or colloids and not less than substantially 60% of rubber, and not to exceed 2% of a substance selected from the slightly soluble salts or compounds of the alkaline earths such as calcium hydroxide and calcium sulphate which tends to invert the emulsion and to reduce the negative charges on the rubber hydrocarbon.

HAROLD B. UNDERWOOD.